United States Patent [19]
Orikasa et al.

[11] Patent Number: 5,326,817
[45] Date of Patent: * Jul. 5, 1994

[54] BLEND OF POLYPHENYLENE ETHER, POLYCARBONATE OR POLYOXYMETHYLENE RESINS AND MULTI-PHASE THERMOPLASTIC RESINS

[75] Inventors: Yuichi Orikasa, Yokohama; Suehiro Sakazume, Fujisawa, both of Japan

[73] Assignees: Nippon Petrochemicals Co. Ltd.; Nippon Oil & Fats Co. Ltd., Japan

[*] Notice: The portion of the term of this patent subsequent to Aug. 25, 2009 has been disclaimed.

[21] Appl. No.: 326,294

[22] Filed: Mar. 21, 1989

[30] Foreign Application Priority Data

Mar. 23, 1988 [JP] Japan .................... 63-68532
Apr. 1, 1988 [JP] Japan .................... 63-80618

[51] Int. Cl.$^5$ .................... C08L 59/00; C08L 71/12; C08L 69/00
[52] U.S. Cl. .................... 525/64; 525/67; 525/68; 525/146; 525/394
[58] Field of Search .................... 525/68, 67, 64, 146, 525/394

[56] References Cited
U.S. PATENT DOCUMENTS 3,933,941 1/1976 Yonemitsu et al. .
4,507,436 3/1985 Axelrod et al. .
4,879,360 11/1989 Kobayashi et al. .

FOREIGN PATENT DOCUMENTS 0282052 9/1988 European Pat. Off. .
0304040 2/1989 European Pat. Off. .
3400540 7/1989 Fed. Rep. of Germany .
2145569 2/1973 France .

*Primary Examiner*—James J. Seidleck
*Assistant Examiner*—Thomas Hamilton, III
*Attorney, Agent, or Firm*—Ostrolenk, Faber, Gerb & Soffen

[57] ABSTRACT

A thermoplastic resin composition is here provided which contains (I) 99 to 1% by weight of a polyphenylene ether resin alone or a mixture of the polyphenylene ether resin and a styrene polymer, (II) 1 to 99% by weight of at least one kind of resin selected from the group consisting of a polycarbonate resin and polyoxymethylene resin, and (III) 0.1 to 100 parts by weight, based on 100 parts by weight of the resins (I) +(II), of a multi-phase structure thermoplastic resin which is composed of 5 to 95% by weight of an epoxy group-containing olefin copolymer and 95 to 5% by weight of a vinyl polymer or copolymer obtained from at least one kind of vinyl monomer, either of both the components being in the state of a dispersion phase having a particle diameter of 0.001 to 10 μm.

A method for preparing the above-mentioned thermoplastic resin composition is also provided here.

4 Claims, 1 Drawing Sheet

BLEND OF POLYPHENYLENE ETHER, POLYCARBONATE OR POLYOXYMETHYLENE RESINS AND MULTI-PHASE THERMOPLASTIC RESINS

BACKGROUND OF THE INVENTION

(1) Field of the Invention

The present invention relates to a thermoplastic resin composition having excellent mechanical toughness, heat resistance, electrical properties, moldability, chemical resistance, impact resistance and appearance of molded articles made therefrom, and a method for preparing the same. This composition of the present case can be widely utilized as materials for electrical and electronic parts, machine parts, automobile parts and the like.

(2) Description of the Prior Art

In recent years, with regard to engineering plastics, various new functions are additionally demanded, and various attempts have been made. One of them is a composition comprising a combination of plural engineering plastics, and this composition has features of the respective plastics and is known as a polymer alloy.

A polyphenylene ether resin is excellent in heat resistance, moldability and mechanical strength, but it has the drawback that its physical properties are somewhat poor. In consequence, the range of its uses is limited at times. On the other hand, a polycarbonate resin has excellent heat resistance, physical properties at low temperatures and impact resistance, but it is poor in chemical resistance and moldability and further has the disadvantage that stress cracks tend to occur therein. Furthermore, a polyoxymethylene resin is excellent in electrical properties but is poor in impact resistance. In particular, it can be presumed that materials having excellent heat resistance and impact resistance will become more and more important, and if the above-mentioned drawbacks of the polyphenylene ether resin and the other resins can be eliminated, they will become extremely useful materials. However, compositions of the polyphenylene ether resin and a polyamide resin or aromatic polyester resin are known, but there have not been compositions in which the polycarbonate resin and polyoxymethylene resin or another resin are used.

This reason is that these resins cannot be mixed easily with each other, since the chemical structures of the resins are different, and affinity between the resins is insufficient.

SUMMARY OF THE INVENTION

The inventors of the present application have intensely researched to solve the above-mentioned problems, and as a result, they have found that when a specific multi-phase structure thermoplastic resin is used, the compatibility of a polyphenylene ether resin with a polycarbonate resin or polyoxymethylene resin is improved, so that a thermoplastic resin composition can be obtained which retains excellent heat resistance, moldability and mechanical strength of the polyphenylene ether resin and excellent impact resistance of the polycarbonate or excellent electrical properties of the polyoxymethylene resin.

That is, the first aspect of the present invention is directed to a thermoplastic resin composition containing (I) 99 to 1% by weight of a polyphenylene ether resin alone or a mixture of the polyphenylene ether resin and a styrene polymer, (II) 1 to 99% by weight of at least one kind of resin selected from the group consisting of a polycarbonate resin and polyoxymethylene resin, and (III) 0.1 to 100 parts by weight, based on 100 parts by weight of the aforesaid resins (I) +(II), of a multiphase structure thermoplastic resin which is composed of 5 to 95% by weight of an epoxy group-containing olefin copolymer and 95 to 5% by weight of a vinyl polymer or copolymer obtained from at least one kind of vinyl monomer, either of both the components being in the state of a dispersion phase having a particle diameter of 0.001 to 10 μm.

The second aspect of the present invention is directed to a method for preparing a thermoplastic resin composition which comprises the step of melting and mixing a polyphenylene ether resin alone or a mixture of the polyphenylene ether resin and a styrene polymer (I) and at least one kind of resin (II) selected from the group consisting of a polycarbonate resin and polyoxymethylene resin, with 1 to 100% by weight of a graft polymerization precursor (A) which is obtained by first adding at least one kind of vinyl monomer, at least one kind of radical polymerizable or copolymerizable organic peroxide and a radical polymerization initiator to an aqueous suspension of an epoxy group-containing olefin copolymer, then heating the suspension under such conditions that the decomposition of the radical polymerization initiator does not occur substantially, in order to impregnate the epoxy group-containing olefin copolymer with the vinyl monomer, radical polymerizable or copolymerizable organic peroxide and radical polymerization initiator, and raising the temperature of this aqueous suspension, when the degree of the impregnation has reached 50% by weight or more of the original total weight of the vinyl monomer, peroxide and initiator, in order to copolymerize the vinyl monomer with the radical polymerizable or copolymerizable organic peroxide in the epoxy group-containing olefin copolymer, 0 to 99% by weight of the epoxy group-containing olefin copolymer (B), and 0 to 99% by weight of a vinyl polymer or copolymer (C) obtained by polymerizing at least one kind of vinyl monomer, or alternatively melting and mixing the components (A), (B) and (C) previously at a temperature in the range of 100° to 300° C. in order to form a multiphase structure thermoplastic resin (III), and then melting and mixing the resin (III) with the resins (I) and (II).

BRIEF DESCRIPTION OF THE DRAWING

The sole FIGURE is an electron microscope photograph (10,000 magnifications) of a multi-phase structure thermoplastic resin prepared in Preparation Example 1 in which spherical styrene polymer particles having a diameter of 0.3 to 0.7 μm are dispersed in a matrix comprising ethyleneglycidyl methacrylate copolymer.

This photograph is captioned "E-GMA-g-PSt: multiphase structure thermoplastic resin".

DETAILED DESCRIPTION OF THE INVENTION

Figure 1:
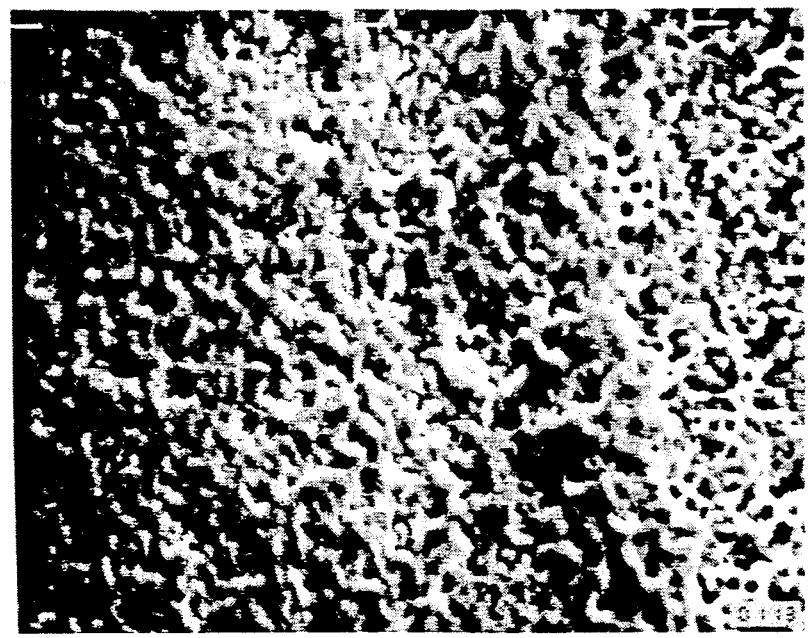

A polyphenylene ether resin used in the present invention is a polymer obtained by oxidizing and polymerizing a phenolic compound represented by the following general formula with oxygen or an oxygen-containing gas in the presence of a coupling catalyst:

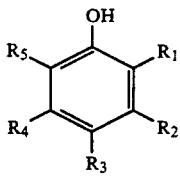

wherein each of $R_1$, $R_2$, $R_3$, $R_4$ and $R_5$ is selected from the group consisting of a hydrogen atom, halogen atom, hydrocarbon group or substituted hydrocarbon group, and at least one of them is a hyrogen atom.

Typical examples of $R_1$, $R_2$, $R_3$, $R_4$ and $R_5$ in the above-mentioned general formula include hydrogen, chlorine, fluorine, iodine, bromine, methyl, ethyl, propyl, butyl, chloroethyl, hydroxyethyl, phenylethyl, benzyl, hydroxymethyl, carboxyethyl, methoxycarbonylethyl, cyanoethyl, phenyl, chlorophenyl, methylphenyl, dimethylphenyl and ethylphenyl.

Typical examples of the phenolic compound having the above-mentioned general formula include phenol, o-, m- and p-cresols, 2,6-, 2,5-, 2,4-and 3,5-dimethylphenols, 2-methyl-6-phenylphenol, 2,6-diphenylphenol, 2,6-dimethylphenol, 2-methyl-6-ethylphenol, and 2,3,5-, 2,3,6- and 2,4,6-trimethylphenols. These phenolic compounds may be used in a combination of two or more thereof.

Other examples of the phenolic compound used in the present invention include copolymers of the phenolic compounds having the above general formula with divalent phenols such as bisphenol A, tetrabromobisphenol A, resorcin and hydroquinone.

Examples of the styrene polymer used in the present invention include homopolymers such as polystyrene, poly($\alpha$-methylstyrene) and poly(p-methylstyrene), highly impact-resistant polystyrenes modified with various rubbers such as butadiene rubber, styrene-butadiene copolymer, ethylene-propylene copolymer and ethylene-propylene-diene copolymer, styrene-maleic anhydride copolymer, styrene-acrylonitrile copolymer, styrene-acrylonitrile-butadiene copolymer and styrene-methylmethacrylate copolymer. The styrene copolymer is used in an amount of 0 to 95% by weight with respect to the polyphenylene ether resin.

The polycarbonate resin used in the present invention include 4,4-dioxyallylalkane polycarbonates typified by a polycarbonate of 4,4-dihydroxydiphenyl-2,2-propane (generally called bisphenol A), but above all, 4,4-dihydroxydiphenyl-2,2-propane polycarbonate having a number average molecular weight of 15,000 to 80,000 is preferable. This polycarbonate may be prepared by an optional method. For example, 4,4-dihydroxydiphenyl-2,2-propane polycarbonate may be prepared by blowing phosgene in 4,4-dihydroxydiphenyl-2,2-propane as a dioxine compound in the presence of an aqueous caustic alkali solution and a solvent, or alternatively by carrying out ester interchange between 4,4-dihydroxydiphenyl-2,2,-propane and diester carbonate in the presence of a catalyst.

Examples of a polyoxymethylene resin used in the present invention include an oxymethylene homopolymer substantially comprising an oxymethylene unit alone prepared from a raw material of a cyclic oligomer such as a formaldehyde monomer or its trioxane or tetraoxane; and an oxymethylene copolymer comprising an oxyalkylene unit having two or more carbons and an oxymethylene unit prepared from the above-mentioned raw material and ethylene oxide, propylene oxide, epichlorhydrin, 1,3-dioxolane, or a cyclic ether such as the formal of glycol or the hormal of diglycol.

The epoxy group-containing olefin copolymer used in the multi-phase structure thermoplastic resin regarding the present invention is a copolymer of an olefin and an unsaturated glycidyl group-containing monomer by a high-pressure radical polymerization as one example, or a terpolymer of an olefin, an unsaturated glycidyl group-containing monomer and another unsaturated monomer, or a multicomponent copolymer. The particularly preferable olefin of the copolymer is ethylene, and the preferable copolymer comprises 60 to 99.5% by weight of ethylene, 0.5 to 40% by weight of the glycidyl group-containing monomer and 0 to 39.5% by weight of another unsaturated monomer.

Examples of the unsaturated glycidyl group-containing monomer include glycidyl acrylate, glycidyl methacrylate, itaconic acid monoglycidyl ester, butenetricarboxylic acid monoglycidyl ester, butenetricarboxylic acid diglycidyl ester, butenetricarboxylic acid triglycidyl ester, vinyl glycidyl ethers and glycidyl esters of $\alpha$-chloroaryl, maleic acid, crotonic acid and fumaric acid, allyl glycidyl ether, glycidyl oxyethylvinyl ether, glycidyl ethers such as styrene p-glycidyl ether, and p-glycidyl styrene. The particularly preferable ones are glycidyl methacrylate and allyl glycidyl ether.

Other examples of the unsaturated monomers include olefins, vinyl esters, $\alpha,\beta$-ethylenic unsaturated carboxylic acids and their derivatives. Typical examples of such unsaturated monomers include olefins such as propylene, butene-1, hexene-1, decene-1, octene-1 and styrene, vinyl esters such as vinyl acetate, vinyl propionate and vinyl benzoate, acrylic acid, methacrylic acid, esters such as methyl, ethyl, propyl, butyl, 2-ethylhexyl, cyclohexyl, dodecyl and octadecyl acrylates and methacrylates, maleic acid, maleic anhydride, iraconic acid, fumaric acid, maleic monoesters and diesters, vinyl ethers such as vinyl chloride, vinyl methyl ether and vinyl ethyl ether, and acrylic amide compounds. Particularly, acrylic and methacrylic esters are preferable.

Typical examples of the epoxy group-containing olefin copolymer include ethylene-glycidyl methacrylate copolymer; ethylene-vinyl acetate-glycidyl methacrylate copolymer; ethylene-ethyl acrylate-glycidyl methacrylate copolymer; ethylene-carbon monoxide-glycidyl methacrylate copolymer; ethylene-glycidyl acrylate copolymer; and ethylene-vinyl acetate-glycidyl acrylate copolymer. Above all, ethylene-glycidyl methacrylate copolymer, ethylene-ethyl acrylate-glycidyl methacrylate copolymer and ethylene-vinyl acetate-glycidyl methacrylate copolymer are preferred.

These epoxy group-containing olefin copolymers can be used as a mixture thereof.

The ethylene copolymer may be prepared by a high-pressure radical polymerization, i.e., by simultaneously or stepwise contacting and polymerizing a monomer mixture of 60 to 99.5% by weight of the above-mentioned ethylene, 0.5 to 40% by weight of one or more unsaturated glycidyl group-containing monomer, and 0 to 39.5% by weight of at least one other unsaturated monomer in the presence of 0.0001 to 1% by weight of a radical polymerization initiator based on the total weight of all the monomers at a polymerization pressure of 500 to 4,000 kg/cm$^2$ preferably 1,000 to 3,500 kg/cm$^2$ at a reaction temperature of 50° to 400° C., preferably 100° to 350° C., using a chain transfer agent and, if necessary, some auxiliaries in an autoclave or tubular reactor.

Examples of the above-mentioned radical polymerization initiator include usual initiators such as peroxides, hydroperoxides, azo-compounds, amine oxide compounds and oxygen.

Examples of the chain transfer agent include hydrogen, propylene, butene-1, saturated aliphatic hydrocarbons having 1 to 20 carbon atoms such as methane, ethane, propane, butane, isobutane, n-hexane, n-heptane and cycloparaffins; halogen-substituted hydrocarbons such as chloroform and carbon tetrachloride; saturated aliphatic alcohols such as methanol, ethanol, propanol and isopropanol; saturated aliphatic carbonyl compounds having 1 to 20 or more carbon atoms such as carbon dioxide, acetone and methyl ethyl ketone; and aromatic compounds such as toluene, diethylbenzene and xylene.

Another example of the epoxy group-containing olefin copolymer used in the present invention is a modified compound prepared by adding the above-mentioned glycidyl group-containing monomer to a conventional olefin homopolymer or copolymer.

Examples of the above-mentioned olefin homopolymer include low-density, medium-density and high-density polyethylenes, polypropylene, polybutene-1 and poly-4-methylpentene-1, and examples of the above-mentioned copolymers include ethylene-propylene copolymer; ethylene-butene-1 copolymer; ethylene-hexene-1 copolymer; ethylene-4-methylpentene-1 copolymer; copolymers with other α-olefins mainly comprising ethylene such as ethylene-octene-1 copolymer; copolymers with other α-olefins mainly comprising propylene such as propylene-ethylene block copolymer; ethylene-vinyl acetate copolymer; ethylene-acrylic acid copolymer; ethylene-methacrylic acid copolymer; copolymers of ethylene and methyl, ethyl, propyl, isopropyl and butyl acrylate and methacrylate; ethylene-maleic acid copolymer; ethylene-propylene copolymer rubber; ethylene-propylenediene-copolymer rubber; liquid polybutadiene; ethylene-vinyl acetate-vinyl chloride copolymer; and mixtures thereof.

Typical examples of the vinyl polymer and copolymer in the multi-phase structure thermoplastic resin used in the present invention include polymers and copolymers prepared by polymerizing one or more of vinyl monomers such as vinyl aromatic monomers, for example, styrene, nucleus-substituted styrenes such as methylstyrene, dimethylstyrene, ethylstyrene, isopropylstyrene and chlorostyrene, and α-substituted styrene such as α-methylstyrene and α-ethylstyrene; acrylate and methacrylate monomers, for example, alkyl esters having 1 to 7 carbon atoms of acrylic acid or methacrylic acid such as methyl, ethyl, propyl, isopropyl and butyl acrylate and methacrylate; acrylonitrile and methacrylonitrile monomers; vinyl ester monomers such as vinyl acetate and vinyl propionate; acrylamide and methacrylamide monomers; and monoesters and diesters of maleic anhydride and maleic acid. Above all, the vinyl polymer and copolymer containing 50% by weight or more of a vinyl aromatic monomer are particularly preferable.

The multi-phase structure thermoplastic resin used in the present invention is an epoxy group-containing olefin copolymer or a vinyl polymer or copolymer matrix in which another vinyl polymer or copolymer or epoxy group-containing olefin copolymer is uniformly dispersed in a spherical form.

The polymer dispersed in the multi-phase structure thermoplastic resin has a particle diameter of 0.001 to 10 μm, preferably 0.01 to 5 μm. When the particle diameter of the dispersed polymer is less than 0.001 μm or is more than 10 μm, the compatibility of the multi-phase structure thermoplastic resin with the polycarbonate resin and the polyphenylene oxide resin is bad, and for example, poor appearance and impact resistance are not improved unpreferably.

The vinyl polymer or copolymer in the multi-phase thermoplastic resin used in the present invention has a number average polymerization degree of 5 to 10,000, preferably 10 to 5,000.

When the number average polymerization degree is less than 5, impact resistance of the thermoplastic resin composition regarding the present invention can be improved, but heat resistance deteriorates unpreferably. Inversely, when it is in excess of 10,000, melting viscosity is high, moldability deteriorates, and surface gloss falls off unpreferably.

The multi-phase thermoplastic resin used in the present invention comprises 5 to 95% by weight, preferably 20 to 90% by weight, of the epoxy group-containing olefin copolymer. Therefore, the content of the vinyl polymer or copolymer is 95 to 5% by weight, preferably 80 to 10% by weight.

When the epoxy group-containing olefin copolymer is less than 5% by weight, its compatible effect with the polyphenylene ether resin, polycarbonate resin or polyoxymethylene resin is not exerted sufficiently, and when it is more than 95% by weight, heat resistance and dimensional stability of the blend regarding the present invention are impaired unpreferably.

As a grafting technique used to prepare the multi-phase structure thermoplastic resin regarding the present invention, there may be employed a well known process such as a chain transfer process and an ionizing radiation process, but the following process is most preferable, because grafting efficiency is high, secondary cohesion due to heat does not occur, and therefore performance can be exerted effectively.

Now, a method for preparing the thermoplastic resin composition of the present invention will be described in detail.

That is, water is suspended in 100 parts by weight of an epoxy group-containing olefin copolymer. Afterward, 5 to 400 parts by weight of at least one vinyl monomer is added to the suspension, and in the mixture, a solution is poured in which there are dissolved 0.1 to 10 parts by weight, based on 100 parts by weight of the vinyl monomer, of one or a mixture of radical polymerizable or copolymerizable organic peroxides represented by the undermentioned general formula (a) or (b) and 0.01 to 5 parts by weight, based on 100 parts by weight of the total of the vinyl monomer and the radical polymerizable or copolymerizable organic peroxide, of a radical polymerization initiator in which a decomposition temperature to obtain a half-life period of 10 hours is from 40° to 90° C. The mixture is then heated under conditions that the decomposition of the radical polymerization initiator does not occur substantially, in order to impregnate the epoxy group-containing olefin copolymer with the vinyl monomer, the radical polymerizable or copolymerizable organic peroxide and the radical polymerization initiator. When the impregnation ratio has reached 50% by weight or more of the original total weight of the monomer, peroxide and initiator, the temperature of this aqueous suspension is raised to copolymerize the vinyl monomer with the radical polymerizable or copolymerizable organic peroxide in the polyolefin, thereby obtaining a graft polymerization precursor (A).

This graft polymerization precursor (A) also is the multi-phase structure thermoplastic resin. Therefore, this graft polymerization precursor (A) may be directly mixed under melting with the polyphenylene ether resin (I) and the polycarbonate resin or polyoxymethylene resin (II).

Furthermore, the multi-phase structure thermoplastic resin (III) regarding the present invention may be prepared by kneading the graft polymerization precursor (A) under melting at a temperature of 100° to 300° C. At this time, the graft polymerization precursor may be kneaded with the epoxy group-containing olefin copolymer (B) or vinyl polymer or copolymer (C) so as to obtain the multi-phase structure thermoplastic resin (III).

The above-mentioned radical polymerizable or copolymerizable organic peroxides are compounds represented by the general formulae (a) and (b):

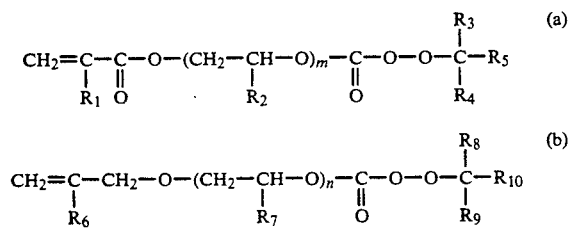

wherein $R_1$ is a hydrogen atom or an alkyl group having 1 or 2 carbon atoms, each of $R_2$ and $R_7$ is a hydrogen atom or a methyl group, $R_6$ is a hydrogen atom or an alkyl group having 1 to 4 carbon atoms, each of $R_3$, $R_4$, $R_8$ and $R_9$ is an alkyl group having 1 to 4 carbon atoms, each of $R_5$ and $R_{10}$ is an alkyl group having 1 to 12 carbon a toms, a phenyl group, an alkyl-substituted phenyl group or a cycloalkyl group having 3 to 12 carbon atoms, m is 1 or 2, and n is 0, 1 or 2.

Typical examples of the radical polymerizable or copolymerizable organic peroxides represented by the general formula (a) include t-butylperoxyacryloyloxyethyl carbonate, t-amylperoxyacryloyloxyethyl carbonate, t-hexylperoxyacryloyloxyethyl carbonate, 1,1,3,3-tetramethylbutylperoxyacryloyloxyethyl carbonate, cumylperoxyacryloyloxyethyl carbonate, p-isopropylcumylperoxyacryloyloxyethyl carbonate, t-butylperoxymethacryloyloxyethyl carbonate, t-amylperoxymethacryloyloxyethyl carbonate, 1,1,3,3-tetramethylbutylperoxymethacryloyloxyethyl carbonate, cumylperoxymethacryloyloxyethyl carbonate, p-isopropylcumylperoxymethacryloyloxyethyl carbonate, t-butylperoxyacryloyloxyethoxyethyl carbonate, t-amylperoxyacryloyloxyethoxyethyl carbonate, t-hexylperoxyacryloyloxyethoxyethyl carbonate, 1,1,3,3-tetramethylbutylperoxyacryloyloxyethoxyethyl carbonate, cumylperoxyacryloyloxyethoxyethyl carbonate, p-isopropylcumylperoxyacryloyloxyethyl carbonate, t-butylperoxymethacryloyloxyethoxyethyl carbonate, t-amylperoxymethacryloyloxyethoxyethyl carbonate, t-hexylperoxymethacryloyloxyethoxyethyl carbonate, 1,1,3,3-tetramethylbutylperoxymethacryloyloxyethoxyethyl carbonate, cumylperoxymethacryloyloxyethoxyethyl carbonate, p-isopropylcumylperoxymethacryloyloxyethoxyethyl carbonate, t-butylperoxyacryloyloxyisopropyl carbonate, t-amylperoxyacryloyloxyisopropyl carbonate, t-hexylperoxyacryloyloxyisopropyl carbonate, 1,1,3,3-tetramethylperoxyacryloyloxyisopropyl carbonate, cumylperoxyacryloyloxyisopropyl carbonate, p-isopropylcumylperoxyacryloyloxyisopropyl carbonate, t-butylperoxymethacryloyloxyisopropyl carbonate, t-amylperoxymethacryloyloxyisopropyl carbonate, t-hexylperoxymethacryloyloxyisopropyl carbonate, 1,1,3,3-tetramethylbutylperoxymethacryloyloxyisopropyl carbonate, cumylperoxymethacryloyloxyisopropyl carbonate, p-isopropylcumylperoxymethacryloyloxyisopropyl carbonate.

Typical examples of the compounds represented by the general formula (b) include t-butylperoxyallyl carbonate, t-amylperoxyallyl carbonate, t-hexylperoxyallyl carbonate, 1,1,3,3-tetramethylbutylperoxyallyl carbonate, p-menthaneperoxyallyl carbonate, cumylperoxyallyl carbonate, t-butylperoxymethallyl carbonate, t-amylperoxymethallyl carbonate, t-hexylperoxymethallyl carbonate, 1,1,3,3-tetramethylbutylperoxymethallyl carbonate, p-menthaneperoxymethallyl carbonate, cumylperoxymethallyl carbonate, t-butylperoxyallyloxyethyl carbonate, t-amylperoxyallyloxyethyl carbonate, t-butylperoxymethallyloxyethyl carbonate, t-amylperoxymethallyloxyethyl carbonate, t-hexylperoxymethallyloxyethyl carbonate, t-butylperoxyallyloxyisopropyl carbonate, t-amylperoxyallyloxyisopropyl carbonate, t-hexylperoxyallyloxyisopropyl carbonate, t-butylperoxymethallyloxyisopropyl carbonate, t-hexylperoxymethallyloxyisopropyl carbonate.

Of these compounds, preferable ones are t-butylperoxyacryloyloxyethyl carbonate, t-butylperoxymethacryloyloxyethyl carbonate, t-butylperoxyallyl carbonate and t-butylperoxymethallyl carbonate.

In the present invention, amounts of the above-mentioned resins (I) and (II) depend upon the purpose of the composition of the present invention.

That is, when it is desired that features of the polyphenylene ether resin (I) are retained and the poor physical properties at low temperatures and low solvent resistance which are drawbacks of the polyphenylene ether resin (I) are improved, there is required 50 to 99% by weight, preferably 60 to 95% by weight, of the polyphenylene ether resin (I).

When the amount of the polyphenylene ether resin is less than 50% by weight, excellent heat resistance and mechanical strength which are features of the polyphenylene ether resin are impaired, and when it is in excess of 99% by weight, the improvement effect of the solvent resistance which is one of the purposes of the present invention is not obtained.

With regard to the component (II) of the present invention, when it is intended that features of the polycarbonate resin are retained and poor stress crack resistance is improved, the polycarbonate resin is required to be present in a ratio of 50 to 99% by weight, preferably 60 to 95% by weight.

When the amount of the polycarbonate resin is less than 50% by weight, excellent heat resistance and mechanical strength which are features of the polycarbonate resin are impaired, and when it is in excess of 99% by weight, the improvement effect of the moldability and solvent resistance which is one of the purposes of the present invention is not obtained.

Moreover, when it is desired that features of the polyoxymethylene resin are retained and poor impact resistance is improved, the polyoxymethylene resin is required to be present in a ratio of 50 to 99% by weight, preferably 60 to 95% by weight.

When the amount of the polyoxymethylene resin is less than 50% by weight, excellent electrical properties and mechanical strength which are features of the polyoxymethylene resin are impaired, and when it is in excess of 99% by weight, the improvement effect of the impact resistance which is one of the purposes of the present invention is not obtained.

In the present invention, the inorganic filler (IV) can be used in an amount of 1 to 150 parts by weight based on 100 parts of the components (I) +(II) +(III).

The inorganic filler may be used in granular, lamellar, scaly, needle, spherical, balloons and fibrous forms, and examples of these inorganic fillers include granular fillers such as calcium sulfate, calcium silicate, clay, diatomaceous earth, talc, alumina, siliceous sand, glass powder, iron oxide, metallic powder, graphite, silicon carbide, silicon nitride, silica, boron nitride, aluminum nitride and carbon black; lamellar and scaly fillers such as mica, glass plate, sericite, pyrophyllite, metallic foil, for example, aluminum flake, and graphite; balloon fillers such as Shirasu balloon, metallic balloon, glass balloon and pumice; and mineral fibers such as glass fiber, carbon fiber, graphite fiber, whisker, metallic fiber, silicon carbide fiber, asbestos and wollastonite.

When the content of the filler is in excess of 150 parts by weight, the impact strength of molded articles deteriorates unpreferably.

The surface of the inorganic filler is preferably treated by the use of stearic acid, oleic acid, palmitic acid or a metallic salt thereof, paraffin wax, polyethylene wax or a modified material thereof, an organic silane, an organic borane or an organic titanate.

Furthermore, in the present invention, the thermoplastic resin composition can be brought into a flame resistant state by blending therewith a flame retardant (V) in an amount of 5 to 150 parts by weight based on 100 parts by weight of the thermoplastic resin composition (I) +(II) +(III).

Examples of the above-mentioned flame retardant include brominated and chlorinated paraffins such as tetrabromobisphenol (TBA), hexabromobenzene, decabromodiphenyl ether, tetrabromoethane (TBE), tetrabromobutane (TBB) and hexabromocyclodecane (HBCD), chlorine series flame retardants such as chlorinated paraffin, chlorinated polyphenyl, chlorinated polyethylene, chlorinated diphenyl, perchloropentacyclodecane and chlorinated naphthalene, usual halogen series flame retardants such as halogenated diphenyl sulfides, halogenated polystyrenes such as brominated polystyrene, brominated poly-α-methylstyrene and derivatives thereof, halogenated polycarbonates such as brominated polycarbonates, halogenated polyesters such as polyalkylene tetrabromoterephthalate and brominated terephthalic acid series polyesters, halogenated epoxy compounds such as halogenated bisphenol series epoxy resins, halogenated polyphenylene oxide compounds such as poly(dibromophenylene oxide), and high-molecular type halogen-containing polymers such as cyanuric acid ester compounds of halogenated bisphenols.

Of these flame retardants, oligomers and polymers of the aromatic halides are particularly preferred.

In addition, phosphorus series flame retardants include phosphates and halogenated phosphates such as tricresyl phosphate, tri(β-chloroethyl) phosphate, tri(-dibromopropyl) phosphate and 2,3-dibromopropyl-2,3-chloropropyl phosphate, phosphonic acid compounds and phosphonic acid derivatives.

Examples of other flame retardants include guanidine compounds such as guanidine nitride.

The above-mentioned organic flame retardants may be used alone or as a mixture of two or more thereof.

The organic flame retardant is used in an amount of 5 to 50 parts by weight, preferably 7 to 40 parts by weight based on 100 parts by weight of the thermoplastic resin composition ( I ) +( II ) +(III ). When the content of the flame retardant is less than 5 parts by weight, a flame-resistive effect is poor, and when it is more than 50 parts by weight, the flame-resistive effect is not improved any more and cost rises unpreferably.

These organic flame retardants, particularly halogen series flame retardants can exert a synergistic effect, when used together with a flame-resistive auxiliary.

Examples of the flame-resistive auxiliary include antiomony halides such as antimony trioxide, antimony pentaoxide, antimony trichloride and antimony pentaoxide, and antimony compounds such as antimony trisulfide, antimony pentasulfide, sodium antimonate, antimony tartrate and metallic antimony.

In addition, examples of the inorganic flame retardants used in the present invention include aluminum hydroxide, magnesium hydroxide, zirconium hydroxide, basic magnesium carbonate, dolonite, hydrotalcite, calcium hydroxide, barium hydroxide, hydrate of stannous hydroxide, hydrates of inorganic metallic compounds of borax and the like, zinc borate, zinc metaborate, barium metaborate, zinc carbonate, magnesum-calcium carbonate, calcium carbonate, barium carbonate, magnesium oxide, molybdenum oxide, zirconium oxide, stannous oxide and red phosphorus. These inorganic flame retardants may be used alone or as a mixture of two or more thereof. Of these flame retardants, hydrates of metallic compounds of aluminum hydroxide, magnesium hydroxide, zirconium hydroxide, basic magnesium carbonate, dolonite, hydrotalcite are particularly preferable. Above all, aluminum hydroxide and magnesium hydroxide are effective as the flame retartants and are economically advantageous.

The particle diameter of the inorganic flame retardant depends upon its kind, but in the cases of aluminum hydroxide and magnesium hydroxide, the average particle diameter is 20 $\mu$m or less, preferably 10 $\mu$m or less.

The inorganic flame retardant is used in an amount of 30 to 150 parts by weight, preferably 40 to 120 parts by weight based on 100 parts by weight of the thermoplastic resin composition (I)+(II)+(III). When the content of the inorganic flame retardant is less than 30 parts by weight, a flame-resistive effect is poor in its single use, and thus it is necessary to add the organic flame retardant thereto. Inversely, when it is more than 150 parts by weight, impact strength and mechanical strength deteriorate.

In the preparation of the thermoplastic composition of the present invention, melting and mixing are carried out at a temperature of 200° to 350° C., preferably 200° to 320° C.

In melting and mixing, there may be used a usual kneader such as a mixing roll, a Banbury's mixer, a kneader mixer, a kneading extruder, a biaxial extruder and rolls. With regard to the order of melting and mixing the respective components, all of the components may be simultaneously melted and mixed, or alternatively the polyphenylene ether resin (I) or at least one kind of the polycarbonate resin and polyoxymethylene resin (II) may be previously mixed under melting with the multi-phase thermoplastic resin (III), and the remaining resin is then mixed.

In the present invention, the following materials can be additionally used, in so far as they do not deviate from the gist of the present invention. Examples of such materials include a polyolefin resin, polyvinyl chloride resin, polyvinylidene chloride resin, fluorine-contained resin, aromatic polyester resin, polyamide resin, polysulfone resin, polyarylene sulfide resin, natural rubber and synthetic rubber, antioxidant, ultraviolet inhibitor, lubricant, dispersant, foaming agent, crosslinking agent and colorant.

Now, the present invention will be described in detail in reference to examples.

PREPARATION EXAMPLE 1

Preparation of Multi-phase Structure Thermoplastic Resin IIIA (EGMA-g-PS)

In a 5-liter stainless steel autoclave was placed 2,500 g of pure water, and 2.5 g of polyvinyl alcohol was further dissolved therein as a suspending agent. To the solution was added 700 g of ethylene-glycidyl methacrylate copolymer as an epoxy group-containing olefin copolymer (content of glycidyl methacrylate =15% by weight; trade name Rexpearl J-3700; made by Nippon Petrochemicals Co., Ltd.), followed by stirring and suspending in a nitrogen atmosphere. Separately, in 300 g of styrene as a vinyl monomer were dissolved 1.5 g of benzoylperoxide as a radical polymerization initiator (trade name Nyper-B; made by Nippon Oils & Fats Co., Ltd.) and 6 g of t-butylperoxymethacryloyloxyethyl carbonate as a radical polymerizable or copolymerizable organic peroxide, and the resulting solution was then placed in the above-mentioned autoclave, followed by stirring.

Afterward, the autoclave was heated up to a temperature of 60° to 65° C., and stirring was then continued for 2 hours, so that the epoxy group-containing olefin copolymer was impregnated with the vinyl monomer containing the radical polymerization initiator and the radical polymerizable or copolymerizable organic peroxide. After it had been confirmed that the total amount of the impregnated vinyl monomer, radical polymerizable or copolymerizable organic peroxide and radical polymerization initiator was 50% by weight or more of the original total weight thereof, the temperature of the mixture was raised up to a level of 80° to 85° C., and this temperature was then maintained for 7 hours to complete polymerization, followed by water washing and drying, thereby obtaining a graft polymerization precursor IIIA'. A styrene polymer was extracted from the graft polymerization precursor with ethyl acetate, and according to measurement by the use of GPC, the number average polymerization degree of the styrene polymer was 900.

Next, this graft polymerization precursor was extruded at 220° C. by a single screw extruder (trade name "Labo" plasto-mill; made by Toyo Seiki Seisaku-sho Ltd.) to perform grafting reaction, whereby a multi-phase structure thermo-plastic resin IIIA was obtained.

This multi-phase structure thermoplastic resin was then observed by a scanning electron microscope (trade name JEOL JSM T300; made by JEOL, Ltd.), and it was found that the resin was a multi-phase structure thermoplastic resin in which spherical resin particles each having a diameter of 0.3 to 0.4 μm were uniformly dispersed, as shown in FIG. 1.

In this case, the grafting efficiency of the styrene polymer was 77.1% by weight.

PREPARATION EXAMPLE 2

Preparation of Multi-phase Structure Thermoplastic Resin IIIB (EGMA-g-AS)

The same procedure as in Preparation Example 1 was repeated with the exception that 300 g of styrene as the vinyl monomer was replaced with mixed monomers of 210 g of styrene and 90 g of acrylonitrile was used, thereby preparing a graft polymerization precursor IIIB'.

EXAMPLES 1 TO 6

The multi-phase structure thermoplastic resins obtained in Preparation Examples 1 and 2 were mixed with polycarbonate resin having a number average molecular weight of 62,000 and modified poly-2,6-dimethyl-1,4-phenylene ether (which is represented by PPE in tables; trade name Noyl 534J; made by Engineering Plastics Co., Ltd. ) as a polyphenylene ether resin in ratios shown in Table 1.

The melting/mixing process was carried out by feeding the respective materials into a one-directional twin-screw extruder (made by Plastic Engineering Institute) and then mixing them under melting in a cylinder thereof. The mixed resin was then formed into granules, and the latter were then dried at 150° C. for 3 hours, followed by injection molding in order to prepare specimens.

Sizes of the specimens and standard tests were as follows:

---

Specimens for notched Izod impact strength
13 × 65 × 6 mm
(JIS K7110)
Specimens for heat distortion temperature
13 × 130 × 6 mm
(JIS K7207)
Specimens for flexural modulus
10 × 130 × 4 mm
(JIS K6758)

---

State of Delamination

The state of delamination was ranked as follows by visually observing the state of the broken surface of each molded article.

⊙: Delamination was not present at all.
○: Delamination was slightly present.
X: Delamination was perceptibly present.

TABLE 1

| Example | 1 | 2 | 3 | 4 | 5 | 6 |
|---|---|---|---|---|---|---|
| Polycarbonate (pts. wt.) | 80 | 80 | 70 | 40 | 30 | 30 |
| PPE (pts. wt.) | 20 | 20 | 30 | 60 | 70 | 70 |
| Multi-Phase Structure | 10 | — | 10 | 10 | 10 | — |

TABLE 1-continued

| Example | 1 | 2 | 3 | 4 | 5 | 6 |
|---|---|---|---|---|---|---|
| Themoplastic Resin IIIA* Multi-Phase Structure | — | 15 | — | 5 | — | 15 |
| Themoplastic Resin IIIB* Notched Izod Impact Strength (kg · cm/cm) | 55 | 57 | 51 | 40 | 33 | 28 |
| Heat Distortion Temperature (°C.) | 130 | 133 | 152 | 165 | 179 | 175 |
| Flexural Modulus ($\times 10^3$ kg/cm$^2$) | 21 | 20 | 21.9 | 21.5 | 23.5 | 23.1 |
| State of Delamination | ⊚ | ⊚ | ⊚ | ⊚ | ⊚ | ⊚ |

*Parts by weight based on 100 parts by weight of polycarbonate + PPE.

EXAMPLES 7 TO 12

The multi-phase structure thermoplastic resins in the above-mentioned examples were replaced with the graft polymerization precursors obtained in Preparation Examples 1 and 2, and the results are set forth in Table 2. Functional effects in these examples were similar to those in the above-mentioned examples using the multi-phase structure thermoplastic resins.

TABLE 2

| Example | 7 | 8 | 9 | 10 | 11 | 12 |
|---|---|---|---|---|---|---|
| Polycarbonate (pts. wt.) | 90 | 80 | 80 | 70 | 20 | 20 |
| PPE (pts. wt.) | 10 | 20 | 20 | 30 | 80 | 80 |
| Graft Polymerization Precursor IIIA'* | 15 | 10 | — | 10 | 10 | — |
| Graft Polymerization Precursor IIIB'* | — | — | 15 | 5 | — | 15 |
| Notched Izod Impact Strength (kg · cm/cm) | 55 | 55 | 53 | 48 | 39 | 35 |
| Heat Distortion Temperature (°C.) | 125 | 126 | 125 | 150 | 180 | 177 |
| Flexural Modulus ($\times 10^3$ kg/cm$^2$) | 21.0 | 20.5 | 19.5 | 21.0 | 24.1 | 23.8 |
| State of Delamination | ⊚ | ⊚ | ⊚ | ⊚ | ⊚ | ⊚ |

*Parts by weight based on 100 parts by weight of polycarbonate + PPE.

EXAMPLES 13 TO 18

In the above-mentioned examples, a glass fiber having an average fiber length of 5.0 mm and a diameter of 10 μm was additionally blended. The results are set forth in Table 3.

TABLE 3

| Example | 13 | 14 | 15 | 16 | 17 | 18 |
|---|---|---|---|---|---|---|
| Polycarbonate (pts. wt.) | 90 | 90 | 80 | 80 | 30 | 30 |
| PPE (pts. wt.) | 10 | 10 | 20 | 20 | 70 | 70 |
| Multi-Phase Structure Themoplastic Resin IIIA* | 10 | — | 10 | — | — | — |
| Multi-Phase Structure Themoplastic Resin IIIB* | — | 15 | — | — | 10 | — |
| Graft Polymerization Precursor IIIA'* | — | — | — | 10 | — | — |
| Graft Polymerization Precursor IIIB'* | — | — | — | — | — | 10 |
| Glass Fiber* | 30 | 30 | 30 | 30 | 30 | 30 |
| Notched Izod Impact Strength (kg · cm/cm) | 13 | 15 | 13 | 11 | 16 | 15 |
| Heat Distortion Temperature (°C.) | 148 | 140 | 150 | 155 | 163 | 165 |
| Flexural Modulus ($\times 10^3$ kg/cm$^2$) | 65.0 | 63.0 | 66.0 | 68.0 | 73.0 | 72.0 |

*Parts by weight based on 100 parts by weight of polycarbonate + PPE.

EXAMPLES 19 TO 24

Polyoxymethylenes (trade name Derlin 500; made by Du Pont) (Duracon M90; made by Polyplastics Co., Ltd.) were mixed under melting with the polyphenylene ether resin used in Example 1, the ethylene-glycidyl methacrylate copolymer used in Preparation Example 1 and the multi-phase structure thermoplastic resin obtained in Preparation Example 1 in ratios shown in Table 4.

The melting/mixing process was carried out by feeding the respective materials into a one-directional twin-screw extruder (made by Plastic Engineering Institute) and then mixing them under melting in a cylinder thereof. The mixed resin was then formed into granules, and the latter were then dried at 150° C. for 3 hours, followed by injection molding in order to prepare specimens.

Sizes of the specimens and standard tests were the same as in Example 1.

TABLE 4

| Example | 19 | 20 | 21 | 22 | 23 | 24 |
|---|---|---|---|---|---|---|
| Derlin 500 (pts. wt.) | 80 | — | 70 | — | 30 | — |
| Duracon M90 (pts. wt.) | — | 80 | — | 70 | — | 30 |
| PPE (pts. wt.) | 20 | 20 | 30 | 30 | 70 | 70 |
| Multi-Phase Structure Themoplastic Resin IIIA* | 10 | — | 10 | — | 10 | — |
| Ethylene-Glycidyl Methacrylate Copolymer* | — | 15 | — | 15 | — | 15 |

TABLE 4-continued

| Example | 19 | 20 | 21 | 22 | 23 | 24 |
|---|---|---|---|---|---|---|
| Notched Izod Impact Strength (kg · cm/cm) | 37 | 35 | 42 | 40 | 50 | 53 |
| Heat Distortion Temperature (°C.) | 130 | 133 | 129 | 125 | 108 | 115 |
| Flexural Modulus (×10³ kg/cm²) | 25.8 | 20.3 | 24.0 | 22.4 | 22.5 | 21.0 |
| State of Delamination | ⊚ | ⊚ | ⊚ | ⊚ | ⊚ | ⊚ |

*Parts by weight based on 100 parts by weight of polyoxymethylene + PPE.

EXAMPLES 25 TO 30

The multi-phase structure thermoplastic resin in the above-mentioned examples was replaced with the graft polymerization precursor obtained in Preparation Example 1. The results are set forth in Table 5. Functional effects in these examples were similar to those in the above-mentioned examples using the multi-phase structure thermoplastic resin.

TABLE 5

| Example | 25 | 26 | 27 | 28 | 29 | 30 |
|---|---|---|---|---|---|---|
| Derlin 500 (pts. wt.) | 90 | — | 60 | — | 20 | — |
| Duracon M90 (pts. wt.) | — | 90 | — | 40 | — | 20 |
| PPE (pts. wt.) | 10 | 10 | 40 | 60 | 80 | 80 |
| Graft Polymerization Precursor IIIA'* | 15 | 15 | 10 | 10 | 10 | 10 |
| Notched Izod Impact Strength (kg · cm/cm) | 31 | 30 | 33 | 37 | 48 | 50 |
| Heat Distortion Temperature (°C.) | 125 | 126 | 125 | 115 | 95 | 100 |
| Flexural Modulus (×10³ kg/cm²) | 27.2 | 29.1 | 23.3 | 22.2 | 20.8 | 21.1 |
| State of Delamination | ⊚ | ⊚ | ⊚ | ⊚ | ⊚ | ⊚ |

*Parts by weight based on 100 parts by weight of polyoxymethylene + PPE.

EXAMPLES 31 TO 36

In the above-mentioned examples, a glass fiber having an average fiber length of 5.0 mm and a diameter of 10 μm was additionally blended. The results are set forth

TABLE 6

| Example | 31 | 32 | 33 | 34 | 35 | 36 |
|---|---|---|---|---|---|---|
| Derlin 500 (pts. wt.) | 90 | — | 80 | — | 30 | — |
| Duracon M90 (pts. wt.) | — | 90 | — | 80 | — | 30 |
| PPE (pts. wt.) | 10 | 10 | 20 | 20 | 70 | 70 |
| Multi-Phase Structure Thermoplastic Resin IIIA* | 10 | — | 10 | — | — | — |
| Ethylene-Glycidyl Methacrylate Copolymer* | — | 15 | — | 15 | — | 15 |
| Glass Fiber* | 30 | 30 | 30 | 30 | 30 | 30 |
| Notched Izod Impact Strength (kg · cm/cm) | 13 | 15 | 13 | 11 | 16 | 15 |
| Heat Distortion Temperature (°C.) | 148 | 140 | 150 | 131 | 129 | 133 |
| Flexural Modulus (×10³ kg/cm²) | 65.0 | 61.0 | 57.5 | 55.6 | 53.0 | 52.3 |

*Parts by weight based on 100 parts by weight of polyoxymethylene + PPE.

COMPARATIVE EXAMPLES 1 TO 6

In contrast to the above-mentioned examples, the ethylene-glycidyl methacrylate copolymer used in Preparation Example 1 was employed. The results are set forth in Table 7.

TABLE 7

| Comp. Example | 1 | 2 | 3 | 4 | 5 | 6 |
|---|---|---|---|---|---|---|
| Polycarbonate (pts. wt.) | 90 | 90 | 80 | 70 | 30 | 30 |
| PPE (pts. wt.) | 10 | 10 | 20 | 30 | 70 | 70 |
| Ethylene-Glycidyl Methacrylate Copolymer* | 10 | 15 | 12 | 10 | 10 | 15 |
| Notched Izod Impact Strength (kg · cm/cm) | 45 | 47 | 37 | 28 | 17 | 19 |
| Heat Distortion Temperature (°C.) | 114 | 110 | 103 | 95 | 120 | 117 |
| State of Delamination | ○ | ○ | ○ | X | X | X |

*Parts by weight based on 100 parts by weight of polycarbonate + PPE.

COMPARATIVE EXAMPLES 7 TO 12

In contrast to the above-mentioned examples, maleic anhydride-modified polyethylene (the addition amount of maleic anhydride=1.0% by weight) was used. The results are set forth in Table 8.

TABLE 8

| Comp. Example | 7 | 8 | 9 | 10 | 11 | 12 |
|---|---|---|---|---|---|---|
| Derlin 500 (pts. wt.) | 90 | — | 80 | — | 30 | — |
| Duracon M90 (pts. wt.) | — | 90 | — | 20 | — | 30 |
| PPE (pts. wt.) | 10 | 10 | 20 | 80 | 70 | 70 |
| Maleic Anhydride-Modified Polyethylene* | 10 | 15 | 15 | 10 | 10 | 15 |
| Notched Izod Impact Strength (kg · cm/cm) | 15 | 17 | 19 | 24 | 21 | 24 |
| Heat Distortion Temperature (°C.) | 118 | 115 | 110 | 95 | 91 | 90 |
| State of | X | ○ | ○ | X | X | X |

TABLE 8-continued

| Comp. Example | 7 | 8 | 9 | 10 | 11 | 12 |
|---|---|---|---|---|---|---|
| Delamination | | | | | | |

*Parts by weight based on 100 parts by weight of polyoxymethylene + PPE.

In the thermoplastic resin composition of the present invention, heat resistance, impact resistance, moldability, chemical resistance and electrical properties are improved, and the resin composition of the present case can be easily prepared only mixing raw materials under melting.

What is claimed is:

1. A thermoplastic resin composition which comprises:
   (i) 10 to 30% by weight of polyphenylene ether resin alone or a mixture of the polyphenylene ether resin and a styrene polymer,
   (II) 90 to 70% by weight of at least one kind of resin selected from the group consisting of polycarbonate resins and polyoxymethylene resins, and
   (III) 0.1 to 100 parts by weight, based on 100 parts by weight of the resins (I) +(II), of a multi-phase structure thermoplastic resin formed by melting and mixing a graft polymerization precursor obtained by copolymerizing at least one vinyl monomer selected from the group consisting of vinyl aromatic monomers, (meth)acrylonitrile monomers, and vinyl ester monomers, with at least one radical polymerizable or copolymerizable organic peroxide represented by the following general formulae (a) and (b)

$$CH_2=C-C-O-(CH_2-CH-O)_m-C-O-O-C-R_5 \quad (a)$$
$$\phantom{CH_2=}\ \,R_1\ \,O\phantom{-C-O-(CH_2-}R_2\phantom{-O)_m-}O\phantom{-O-O-}R_4\phantom{-R_5\ }$$
$$\phantom{CH_2=C-C-O-(CH_2-CH-O)_m-C-O-O-}R_3\phantom{R_5}$$

$$CH_2=C-CH_2-O-(CH_2-CH-O)_n-C-O-O-C-R_{10} \quad (b)$$

wherein $R_1$ is a hydrogen atom or an alkyl group having 1 or 2 carbon atoms, each of $R_2$ and $R_7$ is a hydrogen atom or a methyl group, $R_6$ is a hydrogen atom or an alkyl group having 1 to 4 carbon atoms, each of $R_3$, $R_4$, $R_8$, and $R_9$ is an alkyl group having 1 to 4 carbon atoms, each of $R_5$ and $R_{10}$ is an alkyl group having 1 to 12 carbon atoms, a phenyl group, an alkyl-substituted phenyl group or a cycloalkyl group having 3 to 12 carbon atoms, m is 1 or 2, and n is 0, 1 or 2, in particles of an epoxy group-containing olefin copolymer which is composed of 60 to 99.5% by weight of ethylene and 40 to 0.5% by weight of glycidyl acrylate or methacrylate.

2. A thermoplastic resin composition according to claim 1 wherein the vinyl monomer has a content of vinyl aromatic monomer of 50% or more by weight.

3. A thermoplastic resin composition according to claim 1 wherein the component II resin is a polycarbonate resin.

4. A thermoplastic resin composition according to claim 1 wherein the component II resin is a polyoxymethylene resin.

* * * * *